US010398097B1

(12) United States Patent
Oldewening

(10) Patent No.: US 10,398,097 B1
(45) Date of Patent: Sep. 3, 2019

(54) SYSTEM TO STIMULATE TREE SAP SELF-EJECTION FROM A TREE

(71) Applicant: Scott Oldewening, Toronto (CA)

(72) Inventor: Scott Oldewening, Toronto (CA)

(*) Notice: Subject to any disclaimer, the term of this patent is extended or adjusted under 35 U.S.C. 154(b) by 0 days.

(21) Appl. No.: 16/351,880

(22) Filed: Mar. 13, 2019

Related U.S. Application Data

(60) Provisional application No. 62/642,278, filed on Mar. 13, 2018, provisional application No. 62/642,253, filed on Mar. 13, 2018.

(51) Int. Cl.
| | | |
|---|---|---|
| *A01G 23/10* | (2006.01) | |
| *A01G 13/00* | (2006.01) | |
| *A01G 17/02* | (2006.01) | |
| *A01G 13/06* | (2006.01) | |
| *A01G 23/14* | (2006.01) | |
| *A01G 7/00* | (2006.01) | |
| *F28F 27/00* | (2006.01) | |

(52) U.S. Cl.
CPC .............. *A01G 23/14* (2013.01); *A01G 7/00* (2013.01); *F28F 27/00* (2013.01)

(58) Field of Classification Search
CPC .......... A01G 23/10; A01G 23/14; A01G 7/00; A01G 7/04; A01G 13/00; A01G 13/06; A01G 13/02; A01G 17/00; A01G 17/005; G01N 33/0098
See application file for complete search history.

(56) References Cited

U.S. PATENT DOCUMENTS

| | | | | |
|---|---|---|---|---|
| 3,890,740 A * | 6/1975 | Miller | ...................... | A01G 7/00 47/1.01 R |
| 4,495,723 A * | 1/1985 | Wasserman | ............ | A01G 13/06 165/45 |
| 4,614,055 A * | 9/1986 | Day | ...................... | A01G 13/065 47/2 |
| 5,269,183 A * | 12/1993 | Van Bavel | ................ | G01F 1/68 73/204.22 |
| 5,337,604 A * | 8/1994 | Van Bavel | ................ | G01F 1/68 73/204.22 |
| 6,148,559 A * | 11/2000 | May | ........................ | A01G 7/06 47/1.01 F |
| 6,988,332 B2 * | 1/2006 | Harvey | .................. | A01G 23/10 417/130 |
| 7,280,892 B2 * | 10/2007 | Bavel | ...................... | A01G 7/00 239/69 |
| 2005/0121536 A1 * | 6/2005 | Bavel | ...................... | A01G 7/00 239/69 |

* cited by examiner

*Primary Examiner* — Joshua D Huson
(74) *Attorney, Agent, or Firm* — Nolte Intellectual Property Law Group

(57) ABSTRACT

A system to stimulate tree sap self-ejection from a tree through a plurality of spouts by heating or chilling a portion of a tree trunk. The system can include a metal liner and at least one flexible tube wrapped around the metal liner containing a freeze resistant fluid, a shell encapsulates the flexible tube and metal liner around the tree. At least one fluid pump, heat exchanger and controller form the sap self-ejection system which can include one or more sources to heat or chill freeze resistant fluid, creating a system for more efficient sap collection and processing.

18 Claims, 14 Drawing Sheets

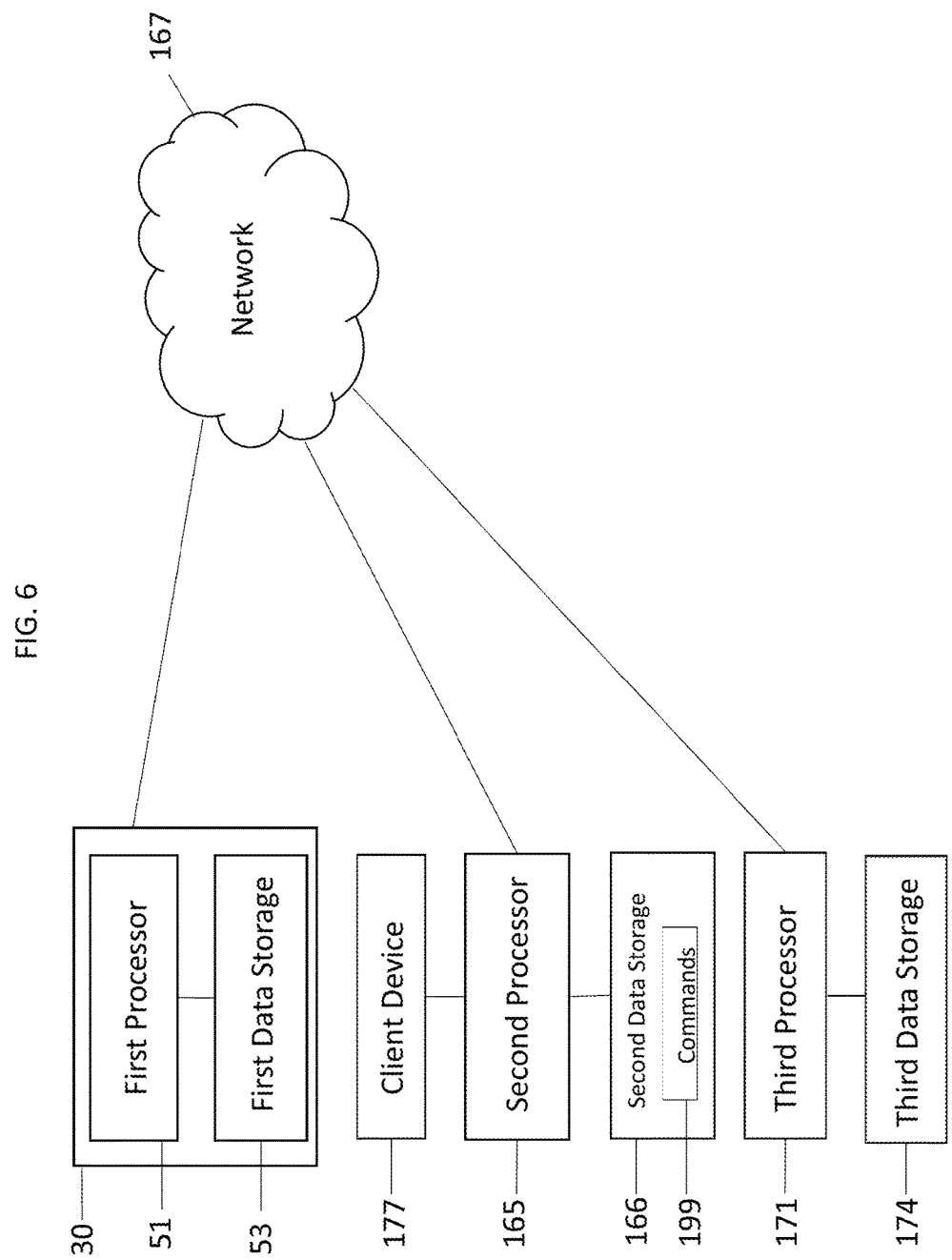

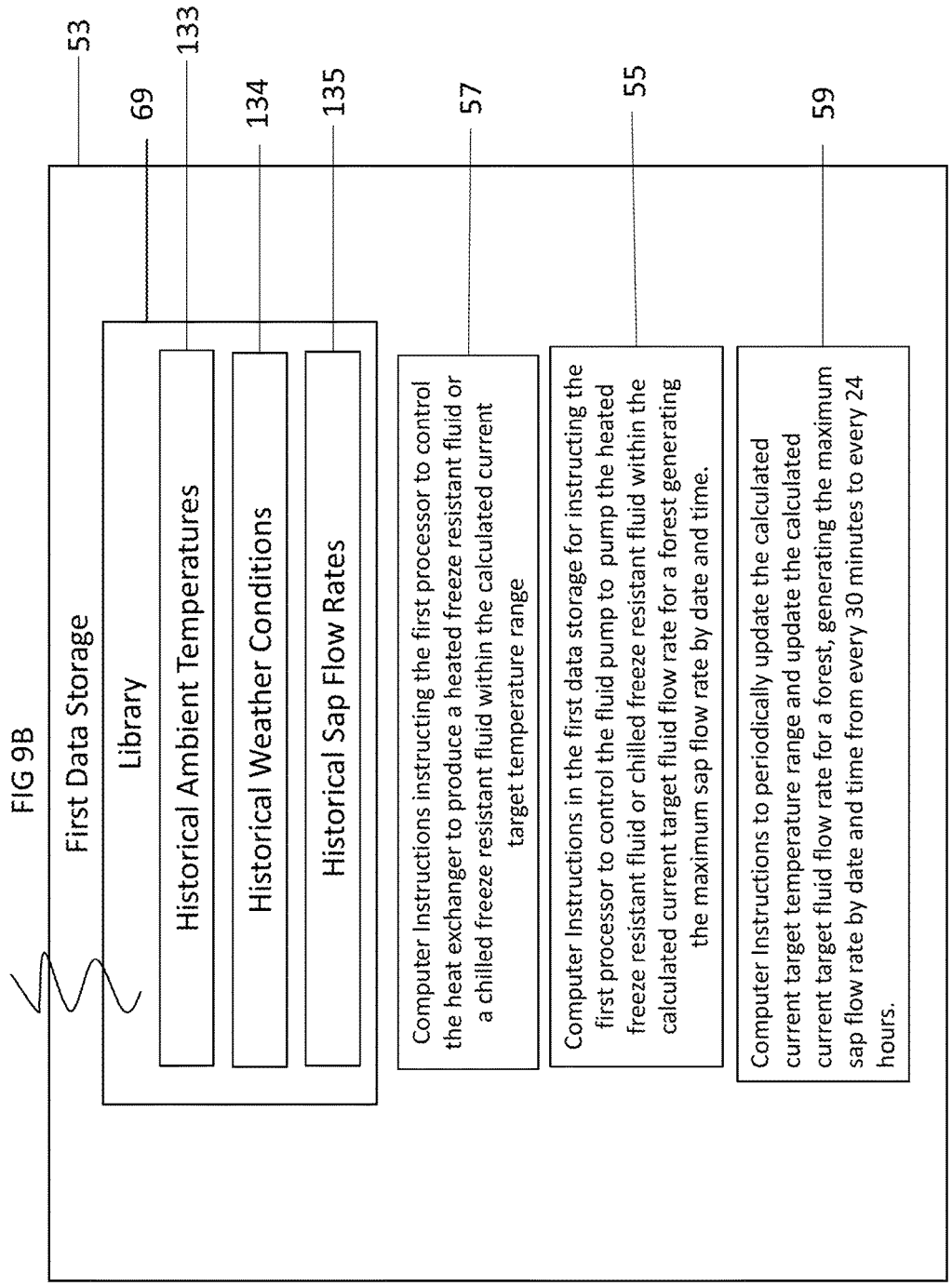

FIGURE 10A

400 — INSTALLING A METAL LINER AROUND A SEGMENT OF A TREE TRUNK USING TAPE

402 — WRAPPING THE TREE TRUNK WITH A FLEXIBLE TUBE, PREFERABLY IN A HELICAL ARRANGEMENT AROUND THE TREE

404 — INSTALLING A SHELL OVER THE FLEXIBLE TUBE AND METAL LINER, FORMING AN INSULATION LAYER OF AIR AROUND THE FLEXIBLE TUBE

406 — CONNECTING THE FLEXIBLE TUBE ON ONE END TO A SUPPLY HOSE AND ON THE OTHER END TO A RETURN HOSE

408 — INSTALLING SPOUTS IN THE TREE THROUGH CLOSABLE PORTHOLES IN THE SHELL

410 — CONNECTING THE SPOUTS TO A SAP COLLECTION LOOP

412 — CONNECTING THE SAP COLLECTION LOOP TO A VACUUM PUMP

414 — CONNECTING THE SUPPLY AND RETURN HOSES TO A FIRST FLUID PUMP

416 — BUNDLING THE SAP COLLECTION LOOP WITH THE RETURN HOSE AND WRAPPING THEM IN INSULATION

FIGURE 10B

- 418 — WRAPPING THE SUPPLY HOSE IN INSULATION
- 420 — FLUIDLY CONNECTING THE FIRT FLUID PUMP TO A HEAT EXCHANGER
- 422 — CONNECTING THE HEAT EXCHANGER TO A SECOND FLUID PUMP
- 424 — CONNECTING THE SECOND FLUID PUMP TO A FIRST SOURCE
- 426 — CONNECTING THE SAP COLLECTION LOOP TO A SAP EXTRACTOR
- 428 — CONNECTING THE SAP EXTRACTOR TO A VACUUM PUMP AND SAP TANK
- 430 — RECEIVING SUPER HEATED FREEZE RESISTANT FLUID FROM A FIRST SOURCE, MODIFYING THE TEMPERATURE OF THE FREEZE RESISTANT FLUID BY HEATING IT WITH THE HEAT EXCHANGER AND FLOWING THE MODIFIED HEATED FREEZE RESISTANT FLUID THROUGH SUPPLY HOSES TO TREES
- 432 — COLLECTING SAP INTO THE SAP STORAGE TANK USING SAP COLLECTION LOOP
- 434 — STOPPING THE SUPER HEATED FREEZE RESISTANT FLUID FROM FLOWING TO THE HEAT EXCHANGER AND FLOWING SUPER CHILLED FREEZE RESISTANT FLUID FROM A SECOND SOURCE TO THE HEAT EXCHANGER AND FLOWING MODIFIED CHILLED FREEZE RESISTANT FLUID THROUGH SUPPLY HOSES TO THE PLURALITY OF TREES TO EXTEND THE SAP COLLECTION SEASON

FIG 11A

Historical Data Library for the Haliburton County Forest

| Day | Month | Year | Time (24 hour clock) | Target Temperature Range for Freeze Resistant Fluid (Degrees Fahrenheit) | Target Fluid Flow Rate (Gallons Per Minute) |
|---|---|---|---|---|---|
| 8 | March | 2019 | 09:00:00 | 160 | 10 (Low) |
| 8 | March | 2019 | 13:00:00 | 155 | 20 (Medium) |
| 8 | March | 2019 | 17:00:00 | 170 | 20 (Medium) |
| 10 | March | 2019 | 09:00:00 | 155 | 10 (Low) |
| 10 | March | 2019 | 13:00:00 | 145 | 10 (Low) |
| 10 | March | 2019 | 17:00:00 | 167.5 | 30 (High) |

FIG 11B

| Ambient Temperature (Degrees Fahrenheit) | Weather Conditions | Sap Flow Rate (Gallons per day) |
|---|---|---|
| -10 | Sunny | 0.6 |
| -5 | Sunny, Windy | 0.6 |
| -10 | Cloudy | 0.4 |
| -5 | Sunny | 0.8 |
| 5 | Sunny | 1 |
| -5 | Cloudy, Windy | 0.5 |

SYSTEM TO STIMULATE TREE SAP SELF-EJECTION FROM A TREE

CROSS REFERENCE TO RELATED APPLICATIONS

The present application claims priority to and the benefit of U.S. Provisional Patent Application Ser. No. 62/642,253 filed on Mar. 13, 2018, entitled "SYSTEM TO STIMULATE TREE SAP SELF-EJECTION FROM A TREE" and U.S. Provisional Patent Application Ser. No. 62/642,278 filed on Mar. 13, 2018, entitled "METHOD TO STIMULATE TREE SAP SELF-EJECTION FROM A TREE". These references are hereby incorporated in their entirety.

FIELD

The present embodiment generally relates to equipment arrangements for stimulating the ejection of sap and methods to stimulate the ejection of sap from sugar maples and other trees with desirable sap.

BACKGROUND

A need exists for equipment for extending the time for harvesting and collecting sap from trees. Sap is generally harvested using spouts, also sometimes referred to as spiles, which are inserted into corresponding tapped holes made on the trunks of trees during the periods of tree dormancy. The sap flows out of the trees through the spouts and is further collected thereafter. Some implementations use buckets or the like in which the sap can drip by gravity and accumulate underneath the spouts. Other implementations use a vacuum system which draws the sap to a central sap processing facility.

A need has existed to improve the period of time that sap will flow from trees, and for the collection of sap with equipment that does not harm a tree. Sap collection can be obtained from all species of maple, walnut, butternut, basswood, hickory and potentially other tree general.

BRIEF DESCRIPTION OF THE DRAWINGS

The detailed description will be better understood in conjunction with the accompanying drawings as follows:

FIG. 6 is a diagram of the processors connected to a network according to one or more embodiments.

FIGS. 9A and 9B depicts the controller according to an embodiment of the invention.

FIGS. 10A and 10B depict method steps according to the invention.

FIGS. 11A and 11B depict a historical data library for an exemplary forest.

Figure 1:
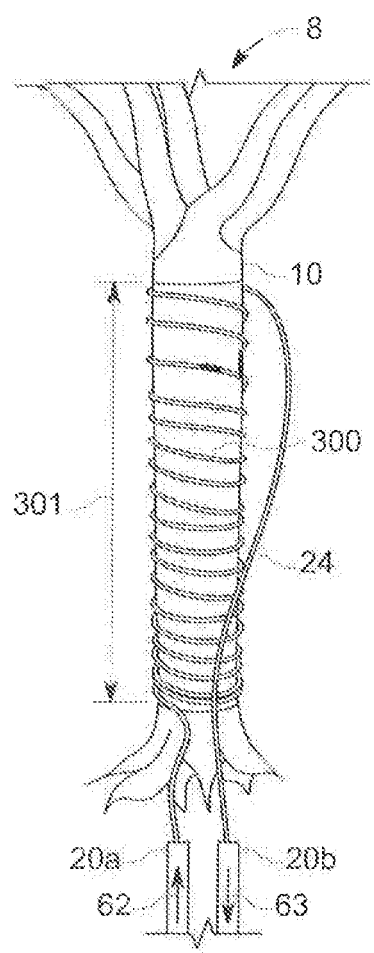
FIG. 1 depicts a partial installation on a single tree according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The invention relates to a system for artificially stimulating sap production in certain trees generally by applying heat to, or by chilling, a portion of individual tree trunks that are in contact with the ground.

A need has existed for increased tree sap production during the period of tree dormancy, in frozen daytime conditions and in warm nighttime conditions, and wherein the stimulated sap production during the dormancy period ranges from a fifth of an average day of production during the traditional sap season, up to one and a half times an average day of production during the traditional sap season, depending on ambient weather conditions.

A need has existed to increase tree sap production for maple, walnut, butternut, basswood, hickory and potentially other trees.

The invention enables an operator to only heat or chill a portion of the tree trunk of certain types of trees in order for sap production to be stimulated.

In embodiments, an expandable insulation shell or plastic cover would be added on top of the flexible tubing and metal liner, in order to create a layer of heated or chilled air as insulation, and to act as a wind break.

To accommodate the tapping of trees in different locations every year a "closable porthole" design for this shell can be used.

The invention relates to sap processing steps using a main boiler and a main chiller wherein a central boiler will heat a fluid that would be pumped out to the forest and a central chiller will chill a fluid that would be pumped out to the forest.

The invention relates to a method for artificially stimulating sap production in certain trees by applying cold and removing heat from a small portion of individual tree trunks that are in contact with the ground.

In embodiments, cold nighttime temperatures could freeze the tree, and then a portion of the tree trunk could be heated during the day, causing the sap to flow. It is anticipated that this daytime heating would be especially effective in areas where the daytime temperatures are close but not quite warm enough to thaw the sap during the day.

In embodiments, a portion of the tree trunk could be chilled during the night and then the warm daytime temperatures could heat the tree, causing the sap to flow. It is anticipated that this chilling overnight would be especially effective in areas where the nighttime temperatures are close but not quite cold enough to freeze the sap overnight.

The invention includes a method for distributing a heated fluid from a main boiler or for distributing a chilled fluid from a main chiller to one or more trees in a controlled manner.

In embodiments, multiple trees for treatment using heat or cold are spread out over a wide area, sometimes as much as 1,000 acres or more.

The invention for groups of trees includes an embodiment referred to herein as a "tree heating loop", which includes certain components for groups of trees, such as 25 sugar maple trees.

In embodiments, each tree heating loop will include a heat exchanger that transfers heat from a boiler to the tree heating fluid, a controller that takes the temperature of the tree heating fluid and turns the heat exchanger on or off as required, and a fluid pump, such as a water pump, that continuously pumps the tree heating fluid through a supply hose that runs to the trees, and through a return hose that runs back to the heat exchanger.

In embodiments, the plastic tubing, fittings and equipment that are used to collect tree sap from groups of trees can be referred to herein as a "sap collection loop", which includes certain components for groups of trees, such as 25 sugar maple trees.

In embodiments, each sap collection loop will include a vacuum pump in a sap processing facility that will create a vacuum in plastic tubing that will be connected to spouts in the trees and will draw sap through the plastic tubing into a sap processing facility. The vacuum pump will also be connected to a sap extractor that will extract the sap from the plastic tubing into a sap storage tank, while maintaining the vacuum in the plastic tubing.

In embodiments, each sap collection loop will be bundled together with a heating fluid return hose within an insulated cover.

Other factors could also affect the controller, including a timer and sap or fluid flow volumes, as necessary.

In embodiments, by freezing the sap in the trees using a chiller, the chiller will work to stimulate sap production, and the waste heat from the chiller can be used in a concentrated sap heating process.

An embodiment of the invention includes a method for using waste heat when using a chiller to freeze the sap in the trees, by using a heat sink with the chiller.

The chiller introduces a new source of waste heat that can be recycled through the invention. When running the chiller, instead of venting its heat, a heat sink can be used to store the waste heat. After the chiller has been turned off, the sap in the trees will thaw and begin to flow. After having been run through a reverse osmosis filter, the concentrated sap can be run through the heat sink to preheat it before it goes into the evaporator for boiling.

The controller can be used in this system to determine if more heat must be removed from the hot freeze resistant fluid before sending the freeze resistant fluid into a chiller.

The invention can include a condenser to attach to evaporators, to condense the water vapor that is produced by the evaporator, to produce more pure water that can be bottled and sold.

In embodiments, a water vapor condenser can be used as a heat exchanger, heating up the concentrated sap before the concentrated sap enters the evaporator for boiling.

In embodiments, the system can use solar heating. An optimized parabolic solar collector facility can be used to heat the fluids of this system.

Each day, the boiler fluid would be pumped through the forest for a while before any sap flows, and the sap will continue to flow after the boiler fluid pump is shut off. The solar heating could be sequentially or synchronously performed on the boiler fluid flow and the concentrated sap flow.

In embodiments, the system can use waste heat from the equipment of the system, such as bottling machines.

In embodiments, the system can use a heat sink that can use waste heat from the evaporator and the bottling machine to: first, pre-heat the collected sap after it has been concentrated by the reverse osmosis filter, but before the concentrated sap is injected into the evaporator, and/or second, boost the heat of the boiler fluid after it has completed a circuit through the forest, and before the boiler fluid goes through the main boiler for primary heating.

The system to stimulate tree sap self-ejection from a tree prevents fires in the forest, by controlling heat to and from tree trunks without the need for open flame near the trees or in the forest.

The system to stimulate tree sap self-ejection from a tree protects wildlife in the forest by providing the means to cause sap flow in trees without adding smoke to the air or using uncontrolled and unmonitored heating devices.

The invention creates an artificial, controlled freeze/thaw cycle, which enables the economical production of pure water and syrup in fall, winter and spring, during the entire period of time that sap producing trees are dormant. The inventive system lengthens the syrup production season.

The invention makes the production of pure water and syrup more economical, enabling the extraction of pure water from alternative, relatively small distributed sources, instead of using the water from one localized natural source (e.g. a stream) or by draining an aquifer. The system enables widespread use of a source of pure water that is distributed over a very large geographical area.

The system enables the economical production of pure water and syrup in locations that far exceed the current geographic limit of syrup production. The system expands the geographical syrup production area and enables jobs to be created in remote areas where agricultural activities do not exist.

The system provides a measure of protecting current syrup producers against climate change and the vagaries of local weather conditions, by creating stable freeze/thaw cycles that will result in known quantities of pure water and syrup production. The system takes the production quantity risk out of syrup production. This will make participation in this industry more attractive to landowners and lenders and encourage new entrants to the industry.

The invention allows syrup operators to use their land and the capital equipment that they have already deployed to produce more pure water and syrup. The system allows for more efficient use of capital that is already deployed.

The system enables enough tree sap production that economies of scale for tree syrups other than maple can be reached, so that pure tree syrups such as walnut syrup, basswood syrup, hickory syrup and others will be mass produced. The system enables the economic mass production of tree syrups other than maple.

Use of the invention will require the engagement of workers for a much longer period than the traditional sap production period, which is typically 6 to 12 weeks in the spring, providing them with gainful employment. The invention will produce much longer employment periods of seasonal workers.

The system uses waste heat effectively to minimize the amount of energy needed to produce pure water and syrup.

The invention uses renewable energy to supply the heat and/or cooling that is needed to stimulate sap production, and to supply the heat that is needed to evaporate water from tree sap to create syrup, preventing either a) greenhouse gas production through the combustion of fossil fuels to supply heat, or b) the creation of a large electric load on power grids in remote locations. The invention prevents the cost and difficulty of serving large and remote electrical loads.

The following definitions are used herein:

The term "closable portholes" refer to openings in the shell that permit spouts to protrude to attach to the sap collection loop. The closable portholes can be various shapes, circles, squares, rectangles, triangles, and range in size from 1 inch in diameter to simply accommodate one spout, to larger in diameter to accommodate the drilling of tap holes in a larger space or to accommodate multiple spouts.

The term "commands" as used herein can be prewritten instructions in the second data storage to control operation of each controller; the commands including an emergency shut off switch. Commands can include: increase heating fluid flow rate at the pump, and increase target fluid temperature range.

The term "concentrated sap" can refer to percolate, which is the product with impurities that results from running tree sap through a reverse osmosis filter. Depending on the sugar content of the tree sap entering the reverse osmosis filter and the quality of the reverse osmosis filter, the concentrated sap could have a sugar content from 8% up to 40%.

The term "condenser" refers to a device for condensing water vapor. An example of this would be a surface condenser of the shell and tube heat exchanger type, where the concentrated sap flows through the tube side and the water vapor enters the shell side, where the condensation occurs on the outside of the tubes. This also has the advantage of preheating the concentrated sap before it enters the evaporator. This could be an Alfa Laval Visco Line Multitube Unit.

The term "controller" refers to a device having a processor and a data storage with computer instructions for instructing the processor to control rates of fluid pumping and computer instructions to control temperatures of freeze resistant fluid to and from the heat exchanger using at least one of: preset values for a particular forest stored in the data storage, a library of preset values stored in the data storage for multiple types of tree forests, and commands supplied from a second processor at a remote location via a network.

The term "evaporator" refers to a device designed to boil tree sap until it becomes approximately 66% sugar, a state which is referred to as syrup. This could be a Lapierre Junior Evaporator, with pans sized 24"×72" that can process the tree sap from 100 to 300 taps.

The term "expandable fasteners" refers to stretchable cords. For example, the expandable fasteners can be 7 inch polyurethane bungee straps with S-hooks, for an overall length of 12 inches. The S-hooks of these fasteners could be connected to eyeholes in the vertical ends of the shell where the ends would join together around the tree trunk.

The term "filtered water" can refer to pure water, which is one product that results from running tree sap through a reverse osmosis filter.

The term "first data storage" can refer to non-evanescent machine readable memory, such as the data storage eon a Lenovo Laptop IdeaPad™ amounting to 8 GB of memory.

The term "first processor" can refer to a processor in a laptop like a Lenovo Laptop IdeaPad™, which could be an AMD A9-9425 3.1 GHz processor that can communicate with the other two processors.

The term "freeze resistant fluid" refers to a fluid that resists solidification at temperatures as low as minus 40 Fahrenheit.

The term "main boiler" as used herein refers to a device or system that fluidly connects to the heat exchanger to sequentially provide a super-heated fluid to the heat exchanger. The main boiler can be at least one of: a geothermal system, a solar heating system, a heat sink, a combustion boiler and an electric boiler or combinations thereof. An example of a main boiler can be a "combi" NTI Boiler Model# TX151C.

The term "main chiller" as used herein refers to a device that fluidly connects to the heat exchanger to sequentially provide a chilled fluid to the heat exchanger. The main chiller can be at least one of: a geothermal system, an electric powered chiller and a natural gas powered chiller or combinations thereof. An example of a main chiller can be a low temperature process chiller that is capable of chilling the freeze resistant fluid to a temperature of minus 40 F, such as a 150 gallon Mydax CryoDax Low Temperature Extraction Chiller The term "metal liner" refers to a continuous layer of metal, such as aluminum foil such as Handi-Foil™ All Purpose Aluminum Foil.

The term "network" refers to the internet, a satellite network, a fiber optic network, a cellular network, a local area network, a wide area network or combinations of these networks.

The term "reverse osmosis filter" can be a filter that pushes water through a membrane to remove impurities. Use of a reverse osmosis filter on a quantity of tree sap results in a quantity of pure water and a quantity of percolate, or concentrated tree sap. In the case of maple syrup processing, the percolate is kept and boiled to make maple syrup. The reverse osmosis filter that could be used could be a Lapierre TURBO-8042-250-3 HP 2000 series, which can process 1,000 L of tree sap per hour and can serve between 500 and 2,500 taps.

The term "sap collection loop" refers to a series of flexible tubes connected from the spouts at the trees to a vacuum pump, a sap extractor and a sap collection tank. In embodiments, the sap collection loop is bundled together with the hoses containing the heated freeze resistant fluid in an insulated conduit to ensure flowability of tree sap in the sap collection loop during freezing temperature conditions in the forest.

The term "sap flow rate" can refer to a rate of sap flow from the trees, consisting of from one half of a pint per day up to 1 gallon per day or more.

The term "second data storage" can refer to non-evanescent machine readable memory such as the data storage on a Lenovo Laptop IdeaPad™, amounting to 8 GB of memory.

The term "second processor" can refer to a processor in a laptop like a Lenovo Laptop IdeaPad™, which could be an AMD A9-9425 3.1 GHz processor that can communicate with at least one other and optionally several other processors.

The term "shell" refers to a single layer or multilayer construction of materials used as insulation over the flexible tubes on a tree trunk, to trap the heat that is being supplied by the flexible tubes. For example, multiple layers of bubble wrap insulation can be used such as rFOIL 2290 Standard Reflective Duct Insulation.

The term "spout" refers to a plastic tube that collects sap from a taphole in a tree trunk and directs it out of the tree. This can be a Lapierre ³⁄₁₆" Clear Seasonal Elbow Spout.

The term "syrup bottling machine" is a machine that is used to pour syrup into bottles in a controlled manner. This can refer to a H20 Innovation ERAEMB360 Maple Syrup Bottling Machine, capable of filling 450 250 mL bottles per hour.

The term "target fluid flow rate" refers to a flow rate of the freeze resistant fluid, which can be a fluid flow rate of from 10 gallons per minute up to 100 gallons per minute or more.

The term "target temperature range" refers to a range of temperatures to be applied to the freeze resistant fluid, such as a temperature range varying from minus 40 degrees Fahrenheit to 200 degrees Fahrenheit.

The term "third processor" can refer to a processor in a laptop like a Lenovo Laptop IdeaPad™, which could be an AMD A9-9425 3.1 GHz processor that can communicate with the other two processors.

The term "water bottling machine" can refer to various types of automated bottling machine such as a Neptune 1000 BPH (bottle per hour) semi-automatic water bottling line.

The invention provides a system to stimulate self-ejection of tree sap from at least one live tree with a tree trunk.

The system including a metal liner encapsulating a segment of a tree trunk for each live tree, at least one flexible tube wound around the metal liner, each flexible tube continuously receiving sequentially either a heated freeze resistant fluid or a chilled freeze resistant fluid, wherein the heated or chilled freeze resistant fluid resists solidification at temperatures from minus 40 degrees to 32 degrees Fahrenheit, a shell forming an insulation layer of air between the metal liner and the shell, and a heat exchanger fluidly connected to a plurality of supply and return hoses engaging each of the flexible tubes.

The heat exchanger is configured to receive superheated fluid from a first source and transmit a heated freeze resistant fluid at a target temperature to the supply hose and then to the at least one flexible tube wound around at least one tree and receive a reduced temperature heated freeze resistant fluid reduced in temperature from 1 to 200 degrees Fahrenheit from the return hose; or receive superchilled fluid from a second source and transmit a chilled freeze resistant fluid at a target temperature to the supply hose and then to the at least one flexible tube wound around at least one tree and receive an increased temperature chilled freeze resistant fluid increased in temperature from 1 to 100 degrees Fahrenheit from the return hose.

The system to simulate self-ejection of tree sap from at least one live tree with a tree trunk also includes at least one fluid pump fluidly connected between the heat exchanger and the supply and return hoses, and a controller electronically connected to the heat exchanger and the fluid pump.

The controller has a first processor, a first data storage, and a library in the data storage.

The library includes historical target temperature ranges for the freeze resistant fluid by date and time for the forest, historical target fluid flow rates for the freeze resistant fluid by date and time for the forest, historical ambient temperatures by date and time for the forest, historical weather conditions by date and time for the forest, and historical sap flow rates by date and time for the forest.

The controller also has a Sap Flow Model in the first data storage to calculate a current target temperature range and calculate a current target fluid flow rate to obtain a maximum sap flow rate by date and time for the forest using the historical target temperature range, historical target fluid flow rate, historical ambient temperature, historical weather conditions, and historical sap flow rates for the forest.

The controller includes computer instructions in the first data storage for instructing the first processor to control the heat exchanger to produce a heated freeze resistant fluid or a chilled freeze resistant fluid within the calculated current target temperature range and computer instructions in the first data storage for instructing the first processor to control the fluid pump to pump the heated freeze resistant fluid or chilled freeze resistant fluid within the calculated current target fluid flow rate for a forest generating the maximum sap flow rate by date and time.

In embodiments, each flexible tube can be formed from at least one polymer based material with an outer diameter between $5/16^{th}$ inch and 2 inches.

In embodiments, the shell can be a non-woven polymer sheet having a thickness from 1/8 inch to 2 inches.

In embodiments, the controller can include computer instructions to periodically update the calculated current target temperature range and update the calculated current target fluid flow rate for a forest, generating the maximum sap flow rate by date and time for a time period from every 30 minutes to every 24 hours.

In embodiments, there can be, as the first source, a main boiler fluidly connected to the heat exchanger and electronically connected to the controller.

In embodiments there can be, as the second source, a main chiller fluidly connected to the heat exchanger and electronically connected to the controller.

In embodiments, the shell can be fastened around the tree trunk with a plurality of expandable fasteners.

In embodiments, the hoses can be bundled together and encapsulated in an insulated conduit from the heat exchanger to each tree.

In embodiments the system can have a sap collection loop, wherein the sap collection loop is bundled into the insulated conduit to ensure flowability of tree sap in the sap collection loop during freezing temperature conditions in the forest.

In embodiments, the system can have a tree sap processing system connected to a sap collection loop, the tree sap processing system having a reverse osmosis filter for receiving tree sap and separating off filtered water forming a concentrated sap, an evaporator for boiling the concentrated sap forming a syrup and water vapor, and a condenser for receiving water vapor and concentrated sap enabling a heat exchange between the water vapor and concentrated sap in the condenser and condensing the water vapor to form liquid water.

In embodiments the system can have a third processor connected to the network electronically monitoring and controlling outputs of the reverse osmosis filter, the evaporator, and the condenser from a remote location.

In embodiments, the system can have a syrup bottling machine fluidly connected to the evaporator for receiving syrup and bottling the syrup.

In embodiments, the system can have a water bottling machine connected to the condenser and the reverse osmosis filter, for receiving liquid water from the condenser and the filtered water from the reverse osmosis filter, for bottling the water.

In embodiments, the shell can have a plurality of closable portholes through the shell, each closable porthole sized 1 inch to 6 inches.

In embodiments, the heat exchanger can be a buffer tank.

In embodiments, the system can have a second processor with second data storage connected to a network, the second processor configured to receive the calculated current target temperature range for each forest, calculated current target fluid flow rate for each forest and generated maximum sap flow rate for each forest and display received calculated current target temperature range, calculated current target fluid flow rates and generated maximum sap flow rate on a client device.

In embodiments, the second processor can be configured to present a geographical map of all the forests with controllers and output from the controllers.

In embodiments, the system can have a plurality of commands in the second data storage to control operation of each controller; the commands including an emergency shut off switch.

Turning now to the Figures, FIG. 1 depicts an installation on a single tree of a portion of the invention.

A tree 8 with a tree trunk 10 is shown for self-ejection of sap from the tree trunk.

Wrapped around the tree trunk 10 is a metal liner 300. The metal liner 300 encapsulates a segment 301 of the tree trunk 10.

At least one flexible tube 24 is wound around the metal liner 300.

This flexible tube can be a 60 foot long flexible tube.

The flexible tube engages two hoses, a supply hose 20a, and a return hose 20b.

Figure 2:
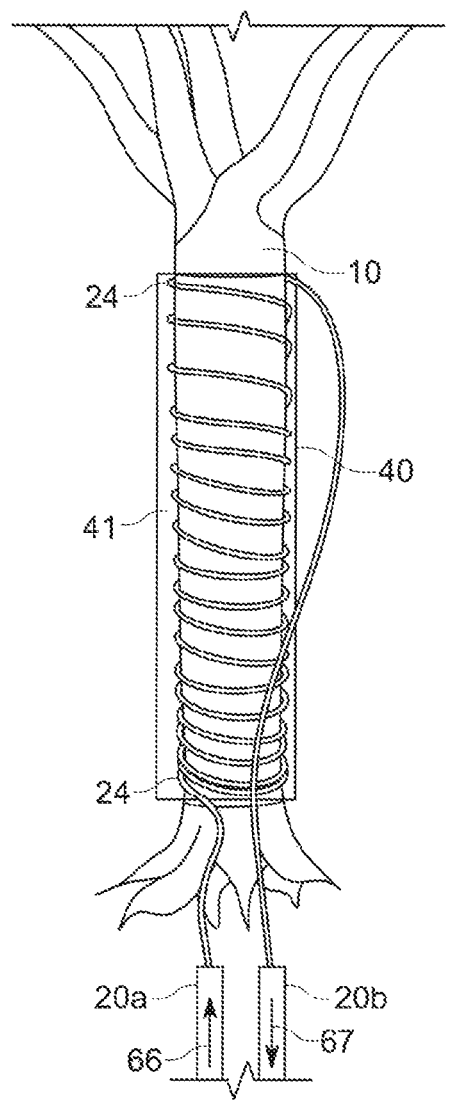
FIG. 2 depicts a single tree installation with the shell installed according to one or more embodiments.

The flexible tube continuously receives sequentially either a heated freeze resistant fluid 62 or a chilled freeze resistant fluid 66 (shown in FIG. 2).

The heated freeze resistant fluid 62 resists solidification at temperatures from minus 60 degrees to 32 degrees Fahrenheit.

From the tree flows a reduced temperature heated freeze resistant fluid 63 through return hose 20b. The reduced temperature heated freeze resistant fluid 63 is reduced in temperature from 1 to 200 degrees Fahrenheit.

The hoses can be plastic tubing that are rounded, having a diameter from 0.5 inches to 2 inches.

FIG. 2 depicts a maple tree with a tree trunk 10 and wrapped in a metal liner over which is wrapped a flexible tube 24.

A shell 40 is fastened around the flexible tube with metal liner encapsulating the flexible tube 24 and metal liner (shown in FIG. 1) forming an insulation layer of air 41.

The shell 40 forms an insulation layer of air 41 between the tree trunk 10 and the shell 40.

In this embodiment a chilled freeze resistant fluid 66 at a target temperature is flowed through the supply hose 20a and then to the flexible tube 24 that is helically wound around the metal liner over the tree trunk.

An increased temperature chilled freeze resistant fluid 67 flows from the tree to the return hose 20b. The temperature of the fluid 67 has increased from 1 to 100 degrees Fahrenheit from the return hose.

Figure 3:
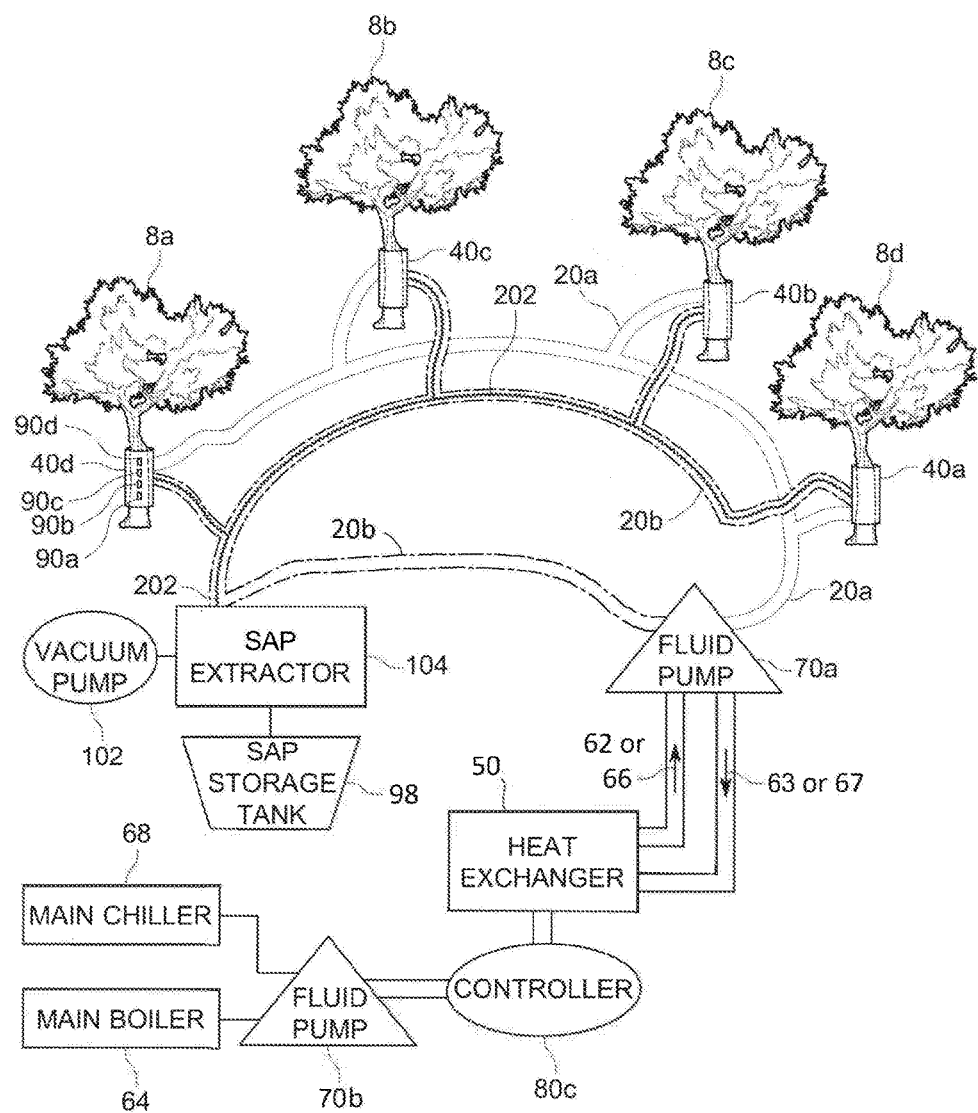
FIG. 3 depicts an embodiment of the system to stimulate tree sap self-ejection according to one or more embodiments.

FIG. 3 depicts an embodiment of the system to stimulate tree sap self-ejection.

FIG. 3 shows at least one fluid pump 70a fluidly connected between a heat exchanger 50 and the supply hoses 20a and return hose 20b.

FIG. 3 shows a first source labelled as a main boiler 64 and a second source labelled as a main chiller 68.

A fluid pump 70b flows superheated fluid from the main boiler or super chilled fluid from the main chiller to a heat exchanger 50 which is controlled electrically by a controller 80c.

FIG. 3 shows a sap collection loop 202 connected to a vacuum pump 102, a sap extractor 104 and a sap storage tank 98.

The vacuum pump 102 creates a vacuum in the sap collection loop 202 pulling tree sap into the sap extractor 104 from the sap collection loop 202 and flowing the sap into a sap storage tank 98 while maintaining the vacuum in the sap collection loop 202.

A heat exchanger 50 is shown fluidly connected to four different trees 8a to 8d.

Each tree is shown having installed thereon a metal liner with a flexible tube wound around each metal liner covered by a shell 40a, 40b, 40c and 40d.

Each shell can be fastened around the tree with a plurality of expandable fasteners 90a,b,c, and 90d.

The sap collection loop 202 can be positioned adjacent to the return hoses 20b within an insulated conduit to warm the sap and keep the sap flowing.

The heat exchanger 50 transmits a heated freeze resistant fluid 62 at a target temperature to the supply hose or a chilled freeze resistant fluid 66 at a target temperature to the supply hose.

The heat exchanger receives a reduced temperature heated freeze resistant fluid 63 reduced in temperature from 1 to 200 degrees Fahrenheit from the return hose or an increased temperature chilled freeze resistant fluid 67 increased in temperature from 1 to 100 degrees Fahrenheit from the return hose.

The controller 80c is electronically connected to the heat exchanger 50 and the fluid pumps.

Figure 4:
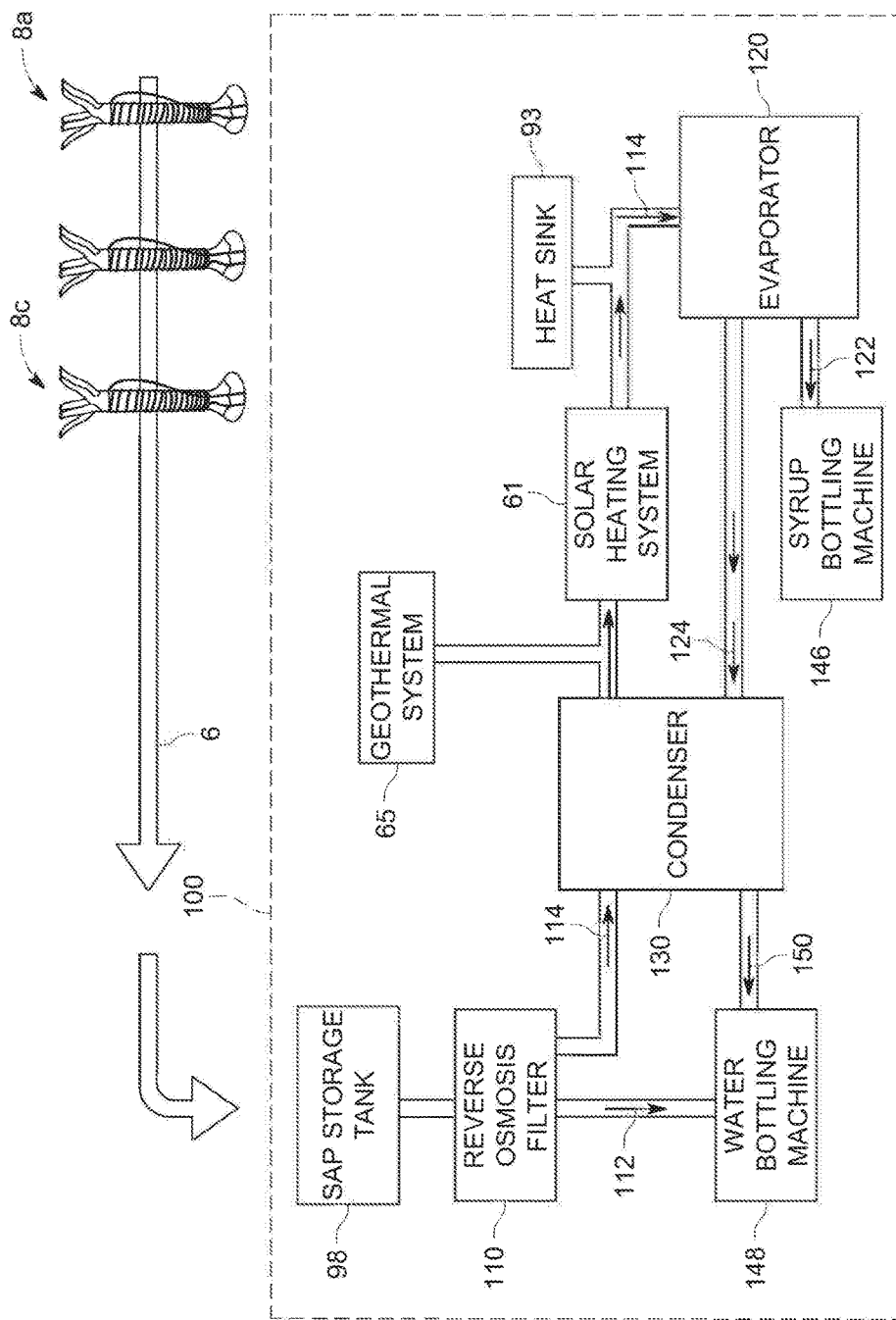
FIG. 4 is a diagram of a maple forest with the system installed as connected to a sap processing system according to one or more embodiments.

FIG. 4 is a diagram of a maple forest with trees 8a-8c producing sap 6 according to one or more embodiments.

The system is depicted further connected to a tree sap processing system 100.

The tree sap processing system 100 has a sap storage tank 98 for receiving tree sap from the forest.

The tree sap processing system 100 has a reverse osmosis filter 110 for receiving tree sap 6 from the sap storage tank 98 and separating off water 112 and forming a concentrated sap 114.

The tree sap processing system has an evaporator 120 for boiling the concentrated sap 114 forming a syrup 122 and water vapor 124.

The tree sap processing system has a condenser 130 for receiving water vapor 124 and concentrated sap 114 enabling a heat exchange between the water vapor 124 and concentrated sap 114 in the condenser 130 and condensing the water vapor 124 to form liquid water 150.

In an embodiment, the concentrated sap 114 can pass through the condenser 130 and through either a geothermal system 65, a solar heating system 61, a heat sink 93 or combinations thereof prior to entering the evaporator 120.

A syrup bottling machine 146 can be connected to the evaporator 120 for receiving syrup 122 and bottles the syrup.

A water bottling machine 148 can be connected to the condenser 130 and the reverse osmosis filter 110 and can receive condensed water 150 and water 112 for bottling the water 112 and the condensed water 150.

Figure 5A:
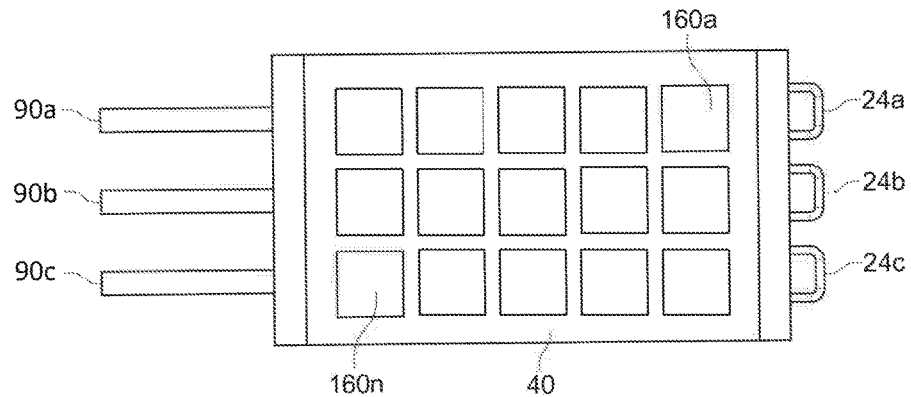
FIGS. 5A and 5B depict the shell showing a plurality of closable portholes and a plurality of fasteners according to one or more embodiments.
Figure 5B:
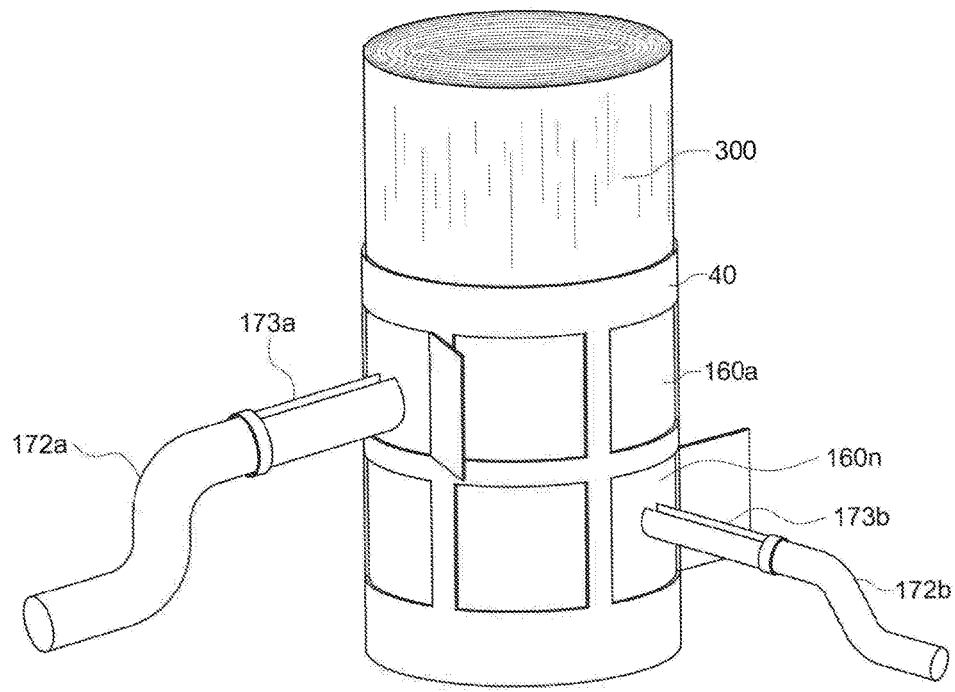

FIGS. 5A and 5B depict an embodiment of the shell 40 which encapsulates flexible tubing 24a,b,c in this embodiment.

FIG. 5B shows the shell 40 mounted around a liner 300 on a tree trunk.

In an embodiment, the shell 40 has a plurality of closable portholes 160a-160n.

The plurality of closable portholes 160a-160n can be formed in rows and in columns.

In an embodiment, the closable portholes formed in rows and columns can be aligned.

Spouts 173a and 173b can be inserted into a tree trunk through the closable portholes to facilitate sap self-ejection.

The spouts 173a and 173b can be connected to sap collection loop tubing 172a and 172b which can convey the sap to a sap processing system.

In an embodiment, each closable porthole 160*a*-160*n* can have an opening from 1 to 6 inches square. Some closable portholes 160*a*-160*n* may be formed 2 inches or 3 inches from the bottom and/or the top of the shell 40.

FIG. 5A shows a plurality of expandable fasteners 90*a*-90*d* (also shown in FIG. 3) that can be used with eye loops to hold the shell 40 around the metal liner over the tree trunk.

Expandable fasteners 90*a*-90*d* can be a plurality of expandable fasteners 90*a*-90*d* such as bungie cords with clips. Each bungie cord and clip 90*a*-90*d* can engage an individual eyelet, as referred to herein as "eye loops". Bungie cords connected to eye loops will enable the shell 40 to completely avoid restricting tree growth over a period of years.

FIG. 6 depicts a diagram of a controller 30 with a first processor 51, electronically connected to a first data storage 53 and a network 167.

The first data storage 53 can have computer instructions to control temperature and control fluid flow rates.

The first data storage 53 can have computer instructions for controlling rates of fluid pumping.

The first data storage 53 can have computer instructions for controlling temperatures of freeze resistant fluid to and from the heat exchanger.

The first data storage 53 can have preset values for a particular forest, can have a library of preset values for multiple types of tree forests, and have a set of commands received from a second processor.

The network 167 can be a satellite network, a cellular network, a global communication network like the Internet or combinations thereof.

A second processor 165, positioned remotely, such as 1050 miles from the first processor of the controller 30, the second processor can be in communication with the first processor through the network 167.

The second processor 165 communicates with a second data storage 166 that contains commands 199 which can be prewritten commands for flow rates, temperature rates, and stop operation.

The second processor can communicate with a client device 177 such as a cell phone enabling further remote communication and monitoring of the system.

FIG. 6 shows a third processor 171 connected to the network for electronically monitoring and controlling outputs of the reverse osmosis filter, the evaporator, and the condenser from a remote location using computer instructions in a third data storage 174.

Figure 7A:
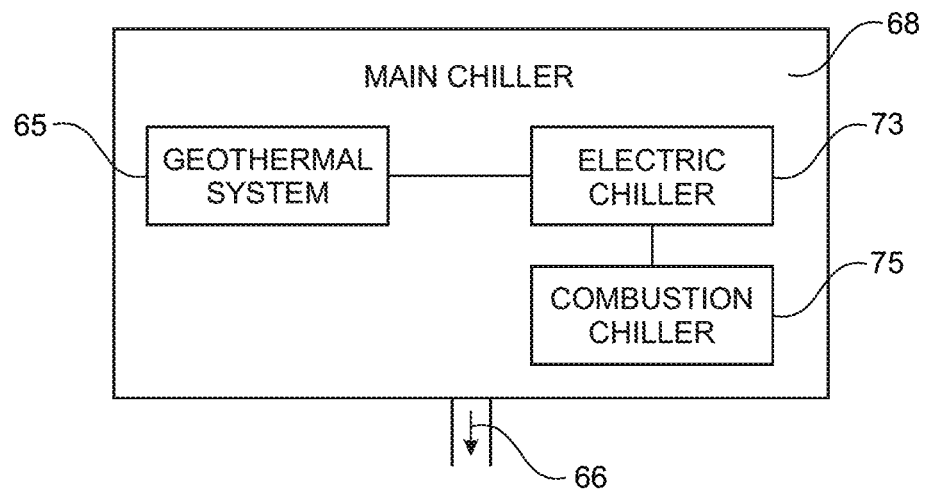
FIGS. 7A and 7B show an embodiment of the main boiler and main chiller according to one or more embodiments.
Figure 7B:
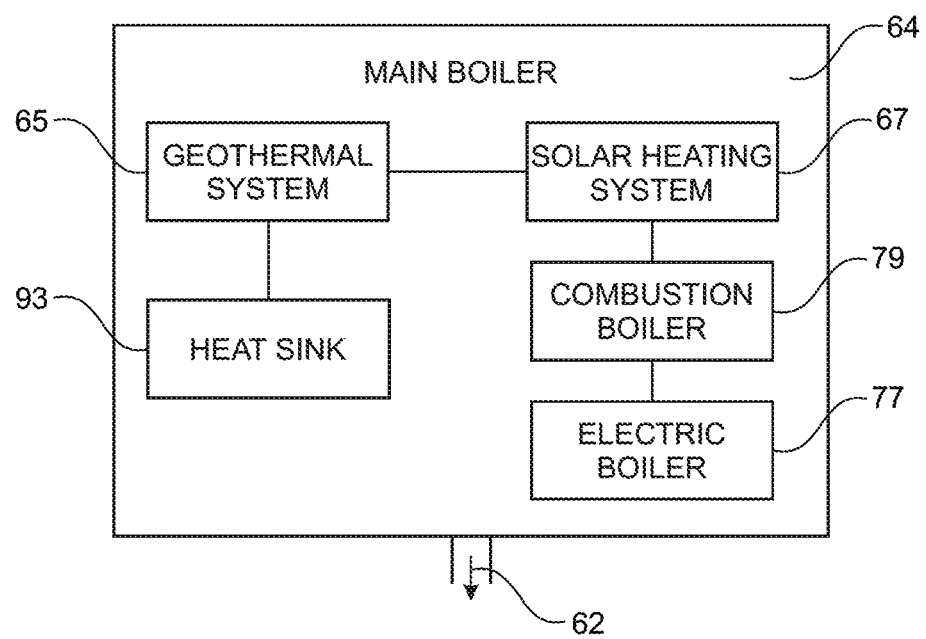

FIGS. 7A and 7B show embodiments of the second and first sources of freeze resistant fluid.

FIG. 7A shows a main chiller 68 which can be one or more of the following: a geothermal system 65, an electric chiller 73, and a combustion chiller 75 providing an outlet of a super chilled freeze resistant fluid through supply hose. The main chiller receives increased temperature chilled freeze resistant fluid through a return hose for additional cooling.

FIG. 7B shows a main boiler 64 which can be one or more of the following: a geothermal system 65, a solar heating system 61, a combustion boiler 79, a heat sink 93, and an electric boiler 77 providing an outlet of a super-heated freeze resistant fluid. The main boiler receives a reduced temperature heated freeze resistant fluid for additional heating.

Figure 8:
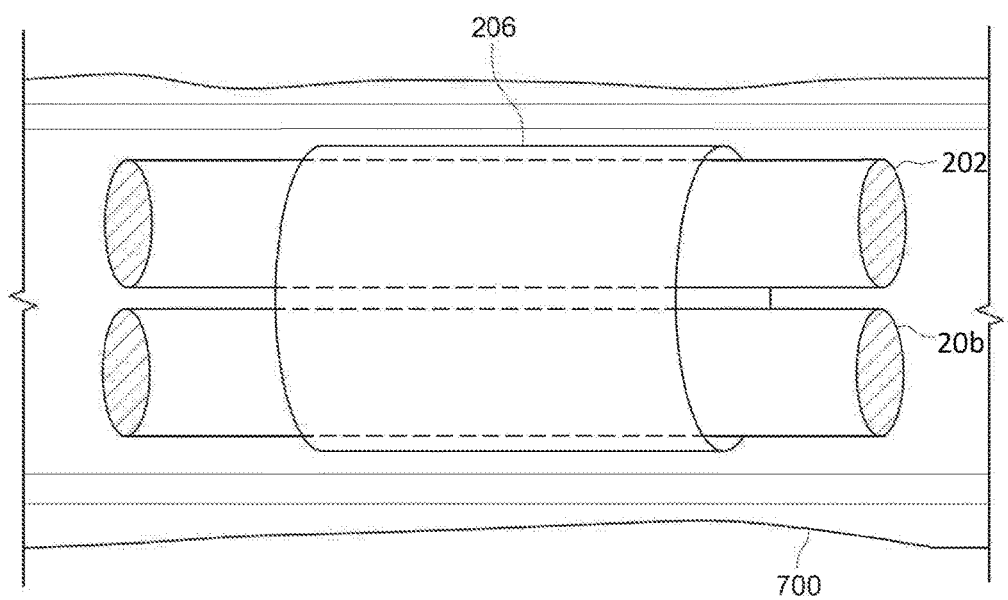
FIG. 8 depicts an embodiment of a sap collection loop bundled with a return hose within an insulated cover.

FIG. 8 depicts a sap collection loop 202 bundled together with a return hose 20*b* within an insulated cover 206 in an insulated conduit 700.

Figure 9A:
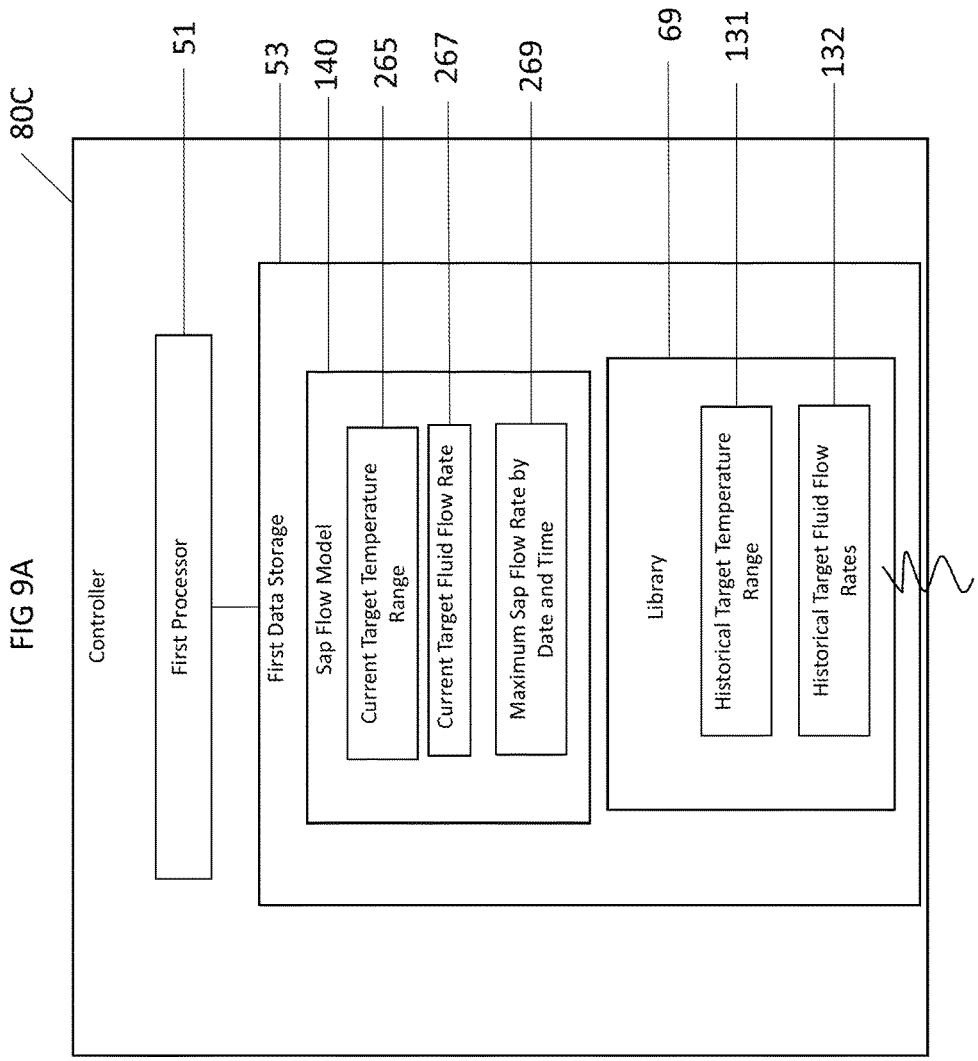

FIGS. 9A and 9B depicts an exemplary controller 80*c* according to embodiments.

The controller has a first processor 51 and a first data storage 53.

The first data storage 53 includes a Sap Flow Model 140 to calculate a current target temperature range 265 and calculate a current target fluid flow rate 267 to obtain a maximum sap flow rate by date and time 269 for the forest using a historical target temperature range, a historical target fluid flow rate, a historical ambient temperature, a historical weather conditions, and a historical sap flow rate for the forest from a library 69 in the first data storage 53.

The library 69 has historical target temperature ranges for the freeze resistant fluid by date and time for the forest 131; historical target fluid flow rates for the freeze resistant fluid by date and time for the forest 132.

FIG. 9B shows the Library 69 contains historical ambient temperatures by date and time for the forest 133.

The Library contains historical weather conditions by date and time for the forest 134.

The Library contains historical sap flow rates by date and time for the forest 135.

The first data storage 53 contains computer instructions 57 for instructing the first processor to control the heat exchanger to produce a heated freeze resistant fluid or a chilled freeze resistant fluid within the calculated current target temperature range.

The first data storage 53 contains computer instructions 55 for instructing the first processor to control the fluid pump to pump the heated freeze resistant fluid or chilled freeze resistant fluid within the calculated current target fluid flow rate for a forest generating the maximum sap flow rate by date and time.

The first data storage 53 contains computer instructions 59 to periodically update the calculated current target temperature range and update the calculated current target fluid flow rate for a forest, generating the maximum sap flow rate by date and time from every 30 minutes to every 24 hours.

The system to stimulate tree sap self-ejection from a tree with a tree trunk can include but is not limited to the steps described below. The method can be utilized by a person of ordinary skill in the industry and is not limited to a particular order or sequence.

FIG. 10A-B depicts a series of steps to implement the system.

Step 400 involves installing a metal liner around a segment of a tree trunk using tape.

Step 402 involves wrapping the tree trunk with a flexible tube, preferably in a helical arrangement around the tree.

Step 404 involves installing a shell over the flexible tube and metal liner, forming an insulation layer of air around the flexible tube.

Step 406 involves connecting the flexible tube on one end to a supply hose and on the other end to a return hose.

Step 408 involves installing spouts in the tree through closable portholes in the shell.

Step 410 involves connecting the spouts to a sap collection loop.

Step 412 involves connecting the sap collection loop to a vacuum pump.

Step 414 involves connecting the supply and return hoses to a first fluid pump.

Step 416 involves bundling the sap collection loop with the return hose and wrapping them in insulation.

Step 418 involves wrapping the supply hose in insulation.

Step 420 involves fluidly connecting the first fluid pump to a heat exchanger.

Step 422 involves connecting the heat exchanger to a second fluid pump.

Step 424 involves connecting the second fluid pump to a first and a second source which can be a main boiler and a main chiller, wherein each is used sequentially.

Step 426 involves connecting the sap collection loop to a sap extractor.

Step 428 involves connecting the sap extractor to a vacuum pump and sap storage tank.

Step 430 involves receiving superheated freeze resistant fluid from a first source, modifying the temperature of the freeze resistant fluid by heating it with the heat exchanger and flowing the modified heated freeze resistant fluid through supply hoses to a plurality of trees.

Step 432 is collecting sap into the sap storage tank using the sap collection loop.

Step 434 is stopping the superheated freeze resistant fluid from flowing to the heat exchanger and flowing super chilled freeze resistant fluid from a second source to the heat exchanger and flowing modified chilled freeze resistant fluid through supply hoses to the plurality of trees to extend the sap collection season.

The method can include controlling rates of fluid pumping, controlling temperatures of freeze resistant fluid to and from the hoses using at least one of: preset values for a particular forest stored in the data storage, a library of preset values stored in the data storage for multiple types of tree forests, and commands supplied from a second processor at a remote location via a network.

FIGS. 11A-11B depict Historical Data for a Library for the Halliburton County Forest with 9 columns.

The first column indicates a day of month.

The second column indicates a month of year.

The third column indicates a year.

The fourth column indicates a time of day using a 24 hour clock.

The fifth column indicates a target temperature range for freeze resistant fluid in Fahrenheit for that day, month, year and time shown in the row.

The sixth column indicates a target fluid flow rate in gallons per minute for freeze resistant fluid in Fahrenheit for that day, month, year and time shown in the row.

The seventh column indicates an ambient temperature in degrees Fahrenheit for that day, month, year and time shown in the row.

The eighth column indicates weather conditions for that day, month, year and time shown in the row.

The ninth column indicates sap flow rates in gallons per day for that day, month, year and time shown in the row for the particular forest.

The controller uses the library described above contained in the data storage, with the historical target temperature ranges for the freeze resistant fluid by date and time for the forest; historical target fluid flow rates for the freeze resistant fluid by date and time for the forest; historical ambient temperatures by date and time for the forest; historical weather conditions by date and time for the forest; historical sap flow rates by date and time for the forest; a Sap Flow Model in the first data storage to calculate a current target temperature range and calculate a current target fluid flow rate to obtain a maximum sap flow rate by date and time for the forest using the historical target temperature range, historical target fluid flow rate, historical ambient temperature, historical weather conditions, and historical sap flow rates for the forest; computer instructions in the first data storage for instructing the first processor to control the heat exchanger to produce a heated freeze resistant fluid or a chilled freeze resistant fluid within the calculated current target temperature range and computer instructions in the first data storage for instructing the first processor to control the fluid pump to pump the heated freeze resistant fluid or chilled freeze resistant fluid within the calculated current target fluid flow rate for a forest generating the maximum sap flow rate by date and time.

The method to stimulate self-ejection of tree sap from at least one live tree with a tree trunk includes installing a metal liner around a segment of a tree trunk and wrapping the tree trunk with a flexible tube over the metal liner and connecting the flexible tube on one end to a supply hose and on an opposite end to a return hose.

Next, a shell can be installed over the flexible tube and metal liner forming an insulation layer of air around the flexible tube and above the metal liner.

Spouts can be inserted in the tree through the shell. The spouts can be connected fluidly to a sap collection loop and connecting the sap collection loop to a pump, and bundling the sap collection loop with the return hose.

Supply and return hoses are fluidly connected to a first fluid pump. The first fluid pump is connected to a heat exchanger and connecting the heat exchanger to a second fluid pump and to a first source.

Superheated freeze resistant fluid from the first source is modifying in the heat exchanger reducing the temperature of the superheated freeze resistant fluid with the heat exchanger and then flowing the modified heated freeze resistant fluid through the supply hose to at least one tree; collecting sap using the sap collection loop.

A controller is used to control rates of fluid pumping, temperatures of freeze resistant fluid to and from the supply and return hoses using at least one of: preset values for a particular forest stored in a data storage of the controller, a library of preset values for multiple types of tree forests in the data storage, thereby extending the sap collection season for the at least one tree. Historical data on temperatures, and on composition of a forest can be used with these calculations as shown in the Figures.

In embodiments, the metal liner is fastened around a segment of a tree trunk using adhesive tape.

In embodiments, the flexible tube is installed in a helical arrangement around the tree.

In embodiments, the shell is installed over the flexible tube and metal liner, forming an insulation layer of air around the flexible tube using a plurality of expandable fasteners.

In embodiments, the spouts are installed in the tree through closable portholes in the shell.

In embodiments, the pump of the sap collection loop is a vacuum pump.

In embodiments, the sap collection loop bundled with the return hose is wrapped in insulation.

In embodiments, the supply hose is wrapped in insulation.

In embodiments, a main boiler is used as the first source to supply superheated fluid to the second fluid pump.

In embodiments, a chiller is used as a first source to supply super chilled freeze resistant fluid to the second fluid pump.

In embodiments, a main boiler and a main chiller can be used as first and second sources to sequentially provide superheated freeze resistant fluid then super chilled freeze resistant fluid to the heat exchanger.

In embodiments, the sap collection loop can fluidly engage a sap extractor, the sap extractor engages the pump and a sap storage tank.

In embodiments, when both a main boiler and a main chiller are used, the controller can be used to stop the superheated freeze resistant fluid from flowing to the heat exchanger and start flowing super chilled freeze resistant fluid from a second source to the heat exchanger sequentially and flowing modified chilled freeze resistant fluid through supply hoses to the plurality of trees to extend the sap collection season for the at least one tree.

In embodiments, commands can be provided to control the fluid pumps, pump, first source, and the controller from a second processor at a remote location via a network such as 1000 miles away.

EXAMPLE

In an embodiment, the system to stimulate self-ejection of tree sap from at least one live tree with a tree trunk can operate on live trees such as sugar maple trees with a minimum diameter at breast height of 10 inches, but could be as large as 70 inches in diameter at breast height or more.

Each tree can have a tree trunk with a tree trunk segment from 2 feet to 7 feet.

In this example, a metal liner such as a layer of aluminum foil such as Handi-Foil All Purpose Aluminum Foil can be wrapped around the tree trunk segment.

In this example, 6 trees are wrapped with a metal liner of aluminum foil around tree segments. Each tree will be wrapped to a height of 6 feet encapsulating each segment of the tree trunk for each live tree.

In this example, at least one flexible tube such as radiant heat tubing, namely a type of cross-linked polyethylene (PEX) tubing such as Everhot ½" Oxygen Barrier PEX Tubing is wound around each metal liner with an outer diameter of 0.625 inches and an inner diameter of 0.485 inches.

In this example, each tree has generally the same diameter, and 50 feet of tubing is helically wrapped round each segment of the tree trunk. In an embodiment, between 30 feet and 100 feet of tubing can be used on each segment of the tree trunk, depending on the diameter of the tree and height of the segment of the tree trunk. The flexible tubes can have an inner diameter of 0.25 inch-1 inch to ensure flowability of fluid through the tubes.

Each flexible tube per tree continuously receiving sequentially either a heated freeze resistant fluid or a chilled freeze resistant fluid during the period from Nov. 1, 2019 to Mar. 31, 2020.

The heated freeze resistant fluid can be a water/ethylene glycol mix. The concentration of ethylene glycol could vary according to the local ambient temperature range of a forest. For example, if the local ambient temperature range goes as low as minus 35 degrees Fahrenheit, a 50/50 water/ethylene glycol mix will be used. If the local ambient temperature range goes as low as minus 10 degrees Fahrenheit, a 60/40 water/ethylene glycol mix will be used. Liquid "antifreeze" for car radiators also can be used.

In this example, the heated freeze resistant fluid resists solidification at temperatures from minus 76 degrees to 32 degrees Fahrenheit.

After winding the flexible tubes around the tree, the flexible tubes are connected to hoses.

The supply and return hoses can be a plastic hose of varying diameter, connecting the flexible tubes at each tree to the heat exchanger. These tubes vary in size anywhere from ¾" for the lateral lines connecting directly to the trees, up to 2" for the mainlines that come into the processing facility. They should be insulated with foam rubber and can be a type of cross-linked polyethylene (PEX) tubing such as Everhot ¾" Oxygen Barrier PEX Tubing.

In this example the supply and return hoses are ¾ inch hoses with an outer diameter of 0.875 inches and in inner diameter of 0.681 inches for an increased flow rate.

A shell forming an insulation layer of air is installed over the flexible tubes over the metal liner. The layer of air insulation traps the heat that is being supplied to the segment of tree trunk by the flexible tubes.

In this example, the layer of air can be created by multiple layers of bubble wrap insulation such as rFOIL 2290 Standard Reflective Duct Insulation, such as those made by Covertech Flexible Packaging of Canada.

The shell could be another material such as mineral wool insulation. The mineral wool is water resistant.

An optional layer of plastic could be placed over the mineral wool in embodiments.

A heat exchanger is fluidly connected to a plurality of supply and return hoses engaging each of the flexible tubes.

The heat exchanger in this example is a buffer tank, positioned between the main boiler and main chiller, and the hoses connected to the flexible tubes at the trees. This buffer tank could be a 30 gallon or a 200 gallon T2 Thermo2000 BuffMax Buffer Tank. The buffer tank in this example is a 30 gallon tank.

The buffer tank is configured to: receive superheated fluid from a first source such as a high efficiency modulating condensing boiler known as the "combi" NTI Boiler Model# TX151C.

The heat exchanger transmits a heated freeze resistant fluid at a target temperature to the supply hose and then to the at least one flexible tubes wound around each of the six trees and the heat exchanger receives a reduced temperature heated freeze resistant fluid, reduced in temperature from 1 to 200 degrees Fahrenheit from the return hose from each of the six trees.

During November 1 to December 31 in North America, and also during February 15 to April 30 in North America the heat exchanger can receive superchilled fluid from a second source and transmit a chilled freeze resistant fluid 66 at a target temperature to the supply hose and then to the at least one flexible tube wound around at least one tree and receive an increased temperature chilled freeze resistant fluid 67 increased in temperature from 1 to 100 degrees Fahrenheit from the return hose.

In this example of 6 trees, a first fluid pump fluidly connects between the heat exchanger and the supply and return hoses and a second fluid pump connects between the first source, the main boiler, and the heat exchanger. The main boiler can be a high efficiency modulating condensing boiler such as the "combi" NTI Boiler Model# TX151C The fluid pumps are devices to move fluid by mechanical action, such as an electric, rotary positive displacement pump. In this example, the fluid pump connected between the heat exchanger and the hoses could be a Grundfos UPS 26-29 FC Nonsubmersible Circulation Pump (3-speed, rating ⅙ HP), and the fluid pump connected between the boiler and the heat exchanger could be a Grundfos UPS 15-58 FC Nonsubmersible Circulation Pump (3-speed, rating ½₅ HP).

A controller such as a laptop such as a Lenovo Laptop IdeaPad™ is electronically connected to the heat exchanger and to the fluid pump.

The controller includes a first processor which in this example is an AMD A9-9425 3.1 GHz processor.

The controller includes a first data storage amounting to 8 GB of memory.

In the first data storage is a library which in this example can be an Excel file containing tables of data including date, time, historical ambient temperature, historical weather conditions, historical heating fluid target temperatures, historical heating fluid target flow rates, and historical tree sap flow rates.

For this example of 6 trees in Haliburton County in the Province of Ontario Canada the historical target temperature ranges for the freeze resistant fluid by date and time for the forest can be 100 degrees Fahrenheit to 200 degrees Fahrenheit; historical target fluid flow rates can be 10 gallons per minute to 100 gallons per minute; historical ambient temperatures by date and time for the forest can be minus 40 degrees Fahrenheit to 100 degrees Fahrenheit; historical weather conditions by date and time for the forest can be sunny, 20% to 80% overcast, cloudy, rainy, snowy, windy; historical sap flow rates by date and time for the forest can be from one half of a pint per day to a gallon per day or more.

In this example, the controller uses a Sap Flow Model software program to calculate the target fluid temperature range and the target fluid flow rate that would maximize the sap flow rate for the forest at a date and time.

In this example, the Sap Flow Model algorithm for the target fluid temperature is: Target fluid temperature (deg F.)=180 F−(local ambient temperature+30)*(1 if sunny=yes, 0.5 if sunny=no)+(20 F*(1 if windy=yes, 0 if windy=no))

In this example, the Sap Flow Model algorithm for the target fluid flow rate is: Target fluid flow rate=If (sunny=no and windy=yes), then "high" (30 GPM), else if (sunny=no and windy=no) or (sunny=yes and windy=yes), then "medium" (20 GPM), Else "low" (10 GPM).

In this example, the controller is connected to the heat exchanger and to the fluid pumps by the internet. Using the results of the Sap Flow Model, the controller sets the target fluid temperature on the buffer tank and sets the target fluid flow rate on the fluid pumps. In this example, these settings are updated every 30 minutes.

While these embodiments have been described with emphasis on the embodiments, it should be understood that within the scope of the appended claims, the embodiments might be practiced other than as specifically described herein.

What is claimed is:

1. A system to stimulate self-ejection of tree sap from at least one live tree with a tree trunk; the system comprising:
    a. a metal liner encapsulating a segment of a tree trunk for each live tree;
    b. at least one flexible tube wound around the metal liner, each flexible tube continuously receiving sequentially either a heated freeze resistant fluid or a chilled freeze resistant fluid, wherein the heated or chilled freeze resistant fluid resists solidification at temperatures from minus 60 degrees to 32 degrees Fahrenheit;
    c. a shell forming an insulation layer of air between the metal liner and the shell;
    d. a heat exchanger fluidly connected to a plurality of supply and return hoses engaging each of the flexible tubes, the heat exchanger configured to:
        (i) receive superheated fluid from a first source and transmit a heated freeze resistant fluid at a target temperature to the supply hose and then to the at least one flexible tube wound around at least one tree and receive a reduced temperature heated freeze resistant fluid reduced in temperature from 1 to 200 degrees Fahrenheit from the return hose; or
        (ii) receive superchilled fluid from a second source and transmit a chilled freeze resistant fluid at a target temperature to the supply hose and then to the at least one flexible tube wound around at least one tree and receive an increased temperature chilled freeze resistant fluid increased in temperature from 1 to 100 degrees Fahrenheit from the return hose;
    e. at least one fluid pump fluidly connected between the heat exchanger and the supply and return hoses; and
    f. a controller electronically connected to the heat exchanger and the fluid pump; wherein the controller comprises:
        (i) a first processor;
        (ii) a first data storage;
        (iii) a library in the data storage, the library comprising:
            1. historical target temperature ranges for the freeze resistant fluid by date and time for the forest;
            2. historical target fluid flow rates for the freeze resistant fluid by date and time for the forest;
            3. historical ambient temperatures by date and time for the forest;
            4. historical weather conditions by date and time for the forest;
            5. historical sap flow rates by date and time for the forest;
        (iv) a Sap Flow Model in the first data storage to calculate a current target temperature range and calculate a current target fluid flow rate to obtain a maximum sap flow rate by date and time for the forest using the historical target temperature range, historical target fluid flow rate, historical ambient temperature, historical weather conditions, and historical sap flow rates for the forest;
        (v) computer instructions in the first data storage for instructing the first processor to control the heat exchanger to produce a heated freeze resistant fluid or a chilled freeze resistant fluid within the calculated current target temperature range and computer instructions in the first data storage for instructing the first processor to control the fluid pump to pump the heated freeze resistant fluid or chilled freeze resistant fluid within the calculated current target fluid flow rate for a forest generating the maximum sap flow rate by date and time.

2. The system of claim 1, wherein each flexible tube is formed from at least one polymer based material with an outer diameter between $5/16^{th}$ inch and 2 inches.

3. The system of claim 1, wherein the shell is a non-woven polymer sheet having a thickness from ⅛ inch to 2 inches.

4. The system of claim 1, further wherein the controller includes computer instructions to periodically update the calculated current target temperature range and update the calculated current target fluid flow rate for a forest, generating the maximum sap flow rate by date and time from every 30 minutes to every 24 hours.

5. The system of claim 1, further comprising as the second source, a main chiller fluidly connected to the heat exchanger and electronically connected to the controller.

6. The system of claim 1 comprising as the first source, a main boiler fluidly connected to the heat exchanger and electronically connected to the controller.

7. The system of claim 1, wherein the shell can be fastened around the tree trunk with a plurality of expandable fasteners.

8. The system of claim 1, wherein the hoses are bundled together and encapsulated in an insulated conduit from the heat exchanger to each tree.

9. The system of claim 8, comprising: a sap collection loop, wherein the sap collection loop is bundled into the insulated conduit to ensure flowability of tree sap in the sap collection loop during freezing temperature conditions in the forest.

10. The system of claim 9, further comprising a tree sap processing system connected to a sap loop collection system, the tree sap processing system comprising:
  a. a reverse osmosis filter for receiving tree sap and separating off filtered water forming a concentrated sap;
  b. an evaporator for boiling the concentrated sap forming a syrup and water vapor; and
  c. a condenser for receiving water vapor and concentrated sap enabling a heat exchange between the water vapor and concentrated sap in the condenser and condensing the water vapor to form liquid water.

11. The system of claim 10, comprising a third processor connected to the network electronically monitoring and controlling outputs of the reverse osmosis filter, the evaporator, and the condenser from a remote location.

12. The system of claim 10, comprising a syrup bottling machine fluidly connected to the evaporator for receiving syrup and bottling the syrup.

13. The system of claim 10, comprising a water bottling machine connected to the condenser and the reverse osmosis filter for receiving liquid water and the filtered water for bottling.

14. The system of claim 1, wherein the shell comprises a plurality of closable portholes through the shell, each closable porthole sized 1 inch to 6 inches.

15. The system of claim 1, wherein the heat exchanger is a buffer tank.

16. The system of claim 1 comprising a second processor with second data storage connected to a network, the second processor configured to receive the calculated current target temperature range for each forest, calculated current target fluid flow rate for each forest and generated maximum sap flow rate for each forest and display received calculated current target temperature range, calculated current target fluid flow rates and generated maximum sap flow rate on a client device.

17. The system of claim 16, wherein the second processor is configured to present a geographical map of all the forests with controllers and output from the controllers.

18. The system of claim 16, comprising a plurality of commands in the second data storage to control operation of each controller; the commands including an emergency shut off switch.

* * * * *